Aug. 4, 1959 C. HANDEN 2,898,522

CIRCUIT PACKAGE

Filed Dec. 17, 1956 3 Sheets-Sheet 1

INVENTOR.
CARL HANDEN

BY *Harry T. Berriman*
AGENT

Aug. 4, 1959 C. HANDEN 2,898,522

CIRCUIT PACKAGE

Filed Dec. 17, 1956 3 Sheets-Sheet 3

2,898,522
Patented Aug. 4, 1959

2,898,522

CIRCUIT PACKAGE

Carl Handen, Poughkeepsie, N.Y., assignor to International Business Machines Corporation, New York, N.Y., a corporation of New York Application December 17, 1956, Serial No. 628,818

13 Claims. (Cl. 317—101)

This invention relates to circuit packages and more particularly to a building block type of circuit package wherein any desired type of functional circuit may be built up by utilizing unuique circuit modules with means for interlinking the modules to provide necessary signal and voltage paths therebetween.

Due to the complexity of present day electronic equipment, a very large number of electronic components must be utilized and space saving considerations become important in order to limit the size of the equipment. In addition to maintaining the size of electronic equipment within reasonable proportions, the hand assembly of the various functional circuits in the equipment must be simplified and standardized to maintain equipment costs within reasonable limits. A functional circuit may be claimed as a circuit comprised of one or more basic circuits such as triggers, inverters, emitter followers, etc.

In the subject invention, there are provided for each of the basic circuits (or parts thereof), an improved circuit module in the form of a "hollowed-out" square which contains the necessary circuit elements on a thin printed circuit type wafer within the cavity. By reason of the "hollowed-out" construction of the module, the module may serve as its own mold for potting purposes. One edge of the module may carry embedded or printed conductors through which service voltages may be applied to the circuit wafer, an opposite edge of the module carrying circuit inputs, while other edges of the module carry circuit outputs.

A functional circuit consisting of a number of basic circuit modules is achieved by stacking the required modules with the inclusion of a unique martix switch plate between each adjacent pair of modules, for interlinking the inputs and outputs of modules, as required, for the particular functional circuit to be formed. The switch plates also include embedded conductors on one end thereof for passing the service voltages from one module to another. There are also provided endplates which provide external connections between the functional units. Each functional unit is dip soldered after fabrication to effect a permanent interconnection of the various embedded edge conductors of the modules, the switch plates, and any endplates.

It is accordingly an object of the invention to provide an improved circuit package that is small in size tnd easily fabricated.

Another object of the invention is to provide an improved means for packaging an electrical circuit assembly in which interchangeability of the parts thereof is fully realized.

It is another object of the invention to provide a functional circuit package that is comprised of a number of stacked basic circuit modules of improved construction, the circuit package having switch members of unique construction arranged between adjacent modules to electrically interlink the modules.

It is another object of the invention to provide an improved circuit package comprised of desired numbers of basic circuit modules of improved construction, each module including a number of circuit components interlinked by printed circuit type wiring, the circuit components having electrical linkages to conductive areas on the edges of the module and through which the modules may be electrically interconnected, as required, through a switch plate arranged between adjacent modules, the modules and switch plates being stacked to give the desired functional circuit, with the electrical linkage between the plates and modules being rendered permanent by dip soldering the completed assembly.

It is another object of the invention to provide an improved circuit paskage wherein a functional circuit is built up by stacking basic circuit modules including electrical interconnecting means between the circuit modules.

It is still a further object of the invention to provide an improved circuit package comprised of one or more basic circuit modules, each module being in the form of a hollowed out square containing circuit components on a wafer or circuit board within the module cavity, the module serving as its own mold by which the wafer supported components can be potted.

It is still a further object to provide an improved functional circuit unit comprised of any desired combination of basic circuit modules, each module having a number of possible input and output terminals which may be selectively linked to related inputs and outputs of associated modules by an adjustable matrix switch member placed between adjacent modules during their assembly into a functional circuit unit.

It is a still further object to provide an improved functional circuit unit comprised of combinations of circuit modules of basic circuit elements such as triggers, inverters, etc., the modules being stacked to provide the desired functional circuit configuration, each module being rectangular in shape and having exposed input terminals along predetermined edge areas thereof and output terminals along other edge areas thereof, each of the output trminals being linkable to any desired one or ones of the input terminals of a successive module in the stack by an intervening switch plate structure, the switch plate containing a grid conductor pattern with conductive lines on one side of the plate terminating in input tabs located on edge of the plate, each tab being adapted for electrical cooperation with a related input terminal of a successive module in said stack, and groups of conductive lines on the other side of the plate, each group terminating in a group of output tabs on an edge, each edge group being adapted to electrically cooperate with a related output terminal of the preceding module in the stack, permanent connections being made between the lines and groups of lines of a switch plate in such fashion that each successive input tab terminates in a particular related one of the output tabs of all said groups, wherein by breaking off all but one desired tab in tab in each related group, a connection is effected through the unremoved tab in tab and the associated switch plate apparatus to the related input terminal in terminals of the succeeding module.

Another object of the invention is to provide a circuit package arrangement as in the immediately preceding claim with the provision that each said groups of output tabs linked to a related group of lines on one side of said plate is replaced by a single enlarged tab adapted for cooperation with a related one of the preceding module output terminals, the selective linking of an output terminal to a desired one or ones of the input terminals of the succeeding module be effected by a manual breaking of the electrical connection between each enlarged tab and undesired ones of the group of lines connected thereto, said breaking being effected by drilling, punching, etc., through the plate.

Other objects of the invention will be pointed out in the following description and claims and illustrated in the accompanying drawings, which disclose, by way of example, the principle of the invention and the best mode, which has been contemplated of applying that principle.

Figure 10A:
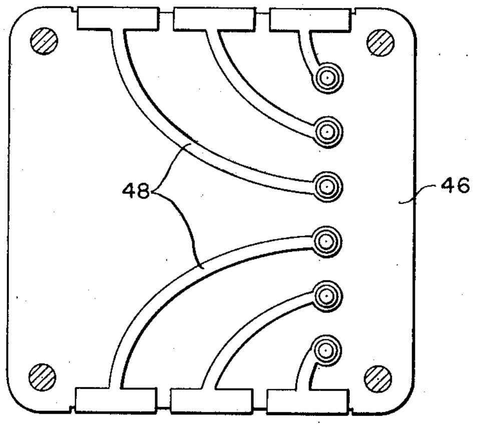
Figure 10C:
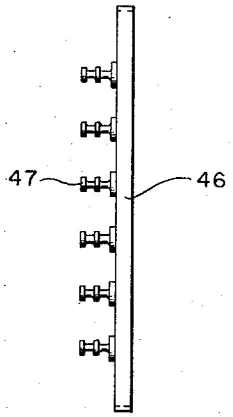
Figure 10B:
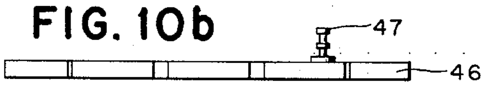

Figs. 10*a*, 10*b* and 10*c* are elevational, bottom, and right end views, respectively of an alternate back end plate structure.

Figure 6:
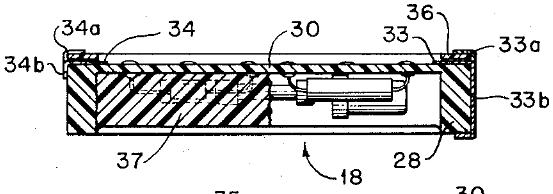
Fig. 6 is a section view taken on the plane of the line 6—6 of Fig. 5, the view being taken through only the rear circuit module (as shown in Fig. 1), the section view showing further details of a representative circuit module, part of the module being broken away to facilitate illustration.
Figure 5:
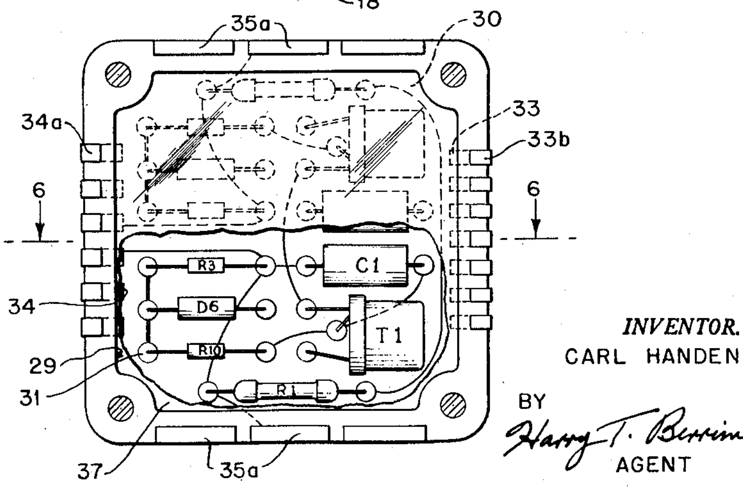
Fig. 5 is a vertical section view taken on the plane of the line 5—5 of Fig. 2 and shows the detail construction of a representative circuit module used in the improved circuit package arrangement, part of the module being broken away to facilitate illustration.
Figure 11:
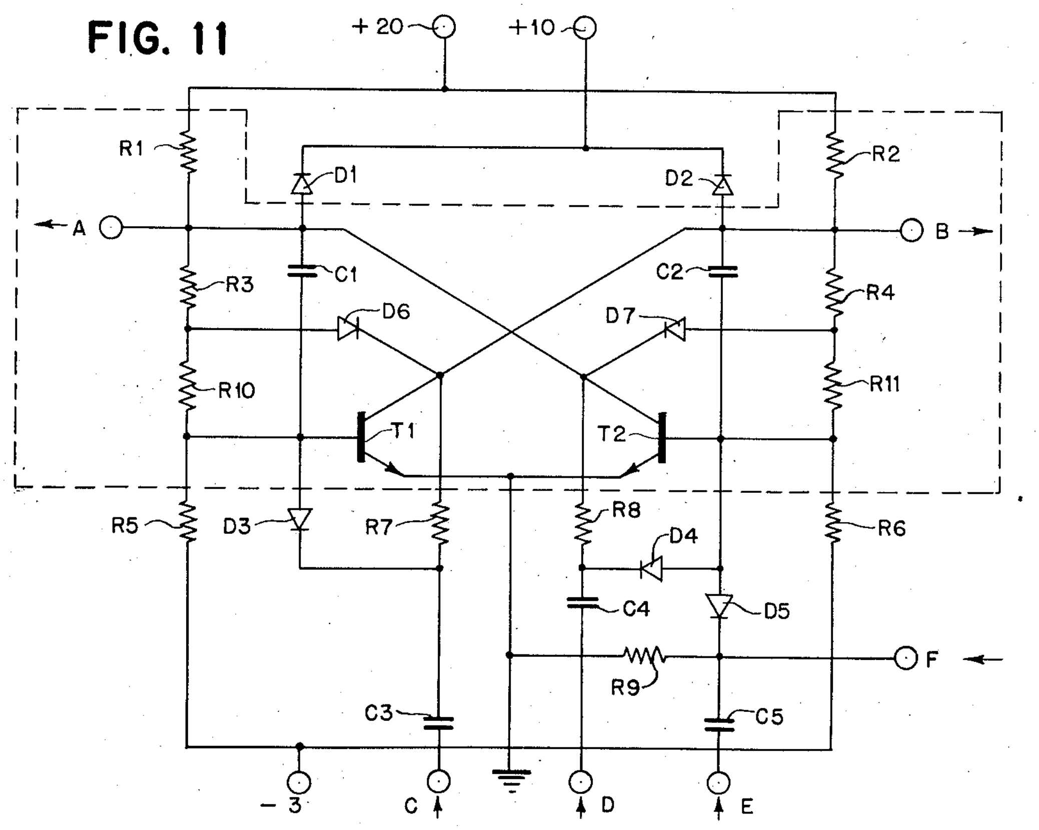

Fig. 11 is a schematic diagram of the trigger circuitry contained in the particular two module circuit package shown in the drawings, that portion of the circuit enclosed within the dotted lines being carried on the circuit module shown in Figs. 5 and 6.

Figure 12:
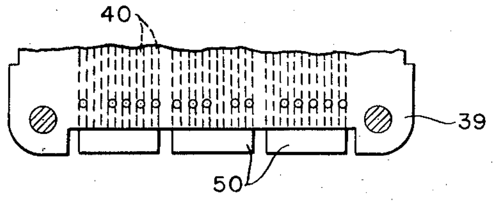

Fig. 12 is a partial plane view of an alternate matrix switch plate structure.

Referring now to Figs. 1, 2, 3 and 4 there is shown a representative circuit package which contains the entire trigger circuit schematically represented in Fig. 11. The circuit package is a sandwich like structure comprising a square shaped front terminal plate 15, a similar square shaped #1 circuit module 16 arranged adjacent the front plate and having one surface in contact with the rear of the front plate 15, a square shaped matrix switch plate 17, having one face engaging the rear of the #1 circuit module 16, a #2 circuit module 18 having a forward portion thereof engaging the rear of the switch plate 17, and a rear plate 19 arranged adjacent a rear surface of the #2 circuit module 18. Screw fastenings 21 extending through suitable aligned holes in the corners of the various sections of the circuit package, secure the various sections rigidly together as indicated. Each of the sections of the circuit package will now be described in detail.

Figure 1:
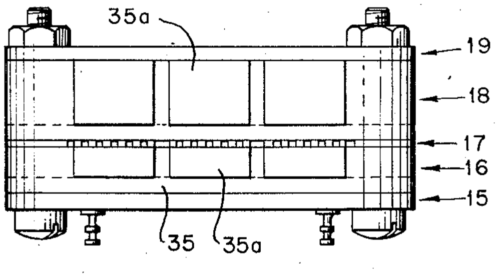
Fig. 1 is a plan view of the improved circuit package arrangement, the package shown being representive and indicated as having two circuit modules and one switch plate therebetween.
Figure 2:
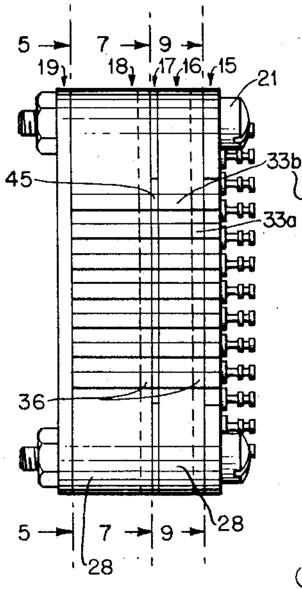
Fig. 2 is a left end view of the representative circuit package arrangement of Fig. 1.
Figure 3:
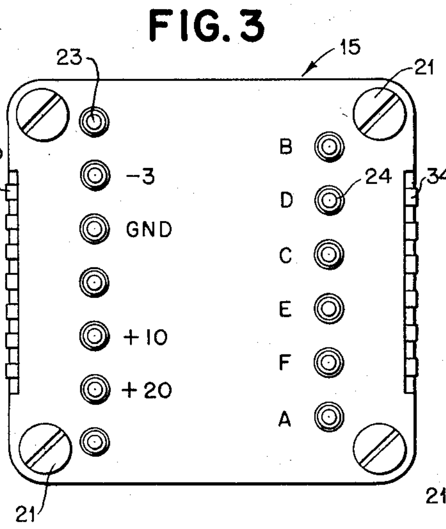
Fig. 3 is a front elevation view of the representative circuit package.
Figure 9:
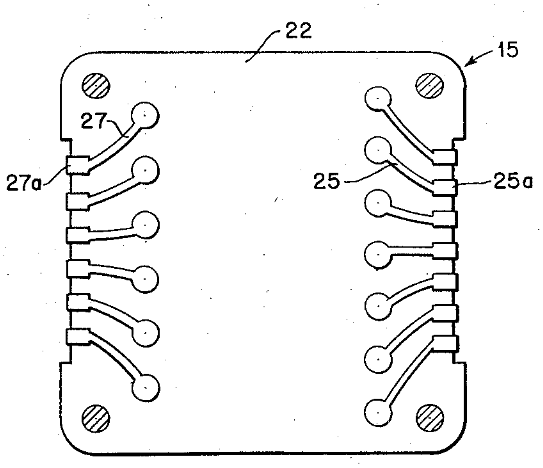
Fig. 9 is a vertical section view taken on the plane of the line 9—9 of Fig. 2 and shows the rear surface of a so-called front end plate of the improved circuit package arrangement.

Referring now to Figs. 1, 2, 3, 4, and 9 and particularly to Figs. 3 and 9, the front plate 15 comprises an approximately square shaped sheet 22 of insulating material supporting a line of seven spaced voltage terminals 23 and a line of six spaced signal terminals 24. Each of the voltage terminals 23 has a portion thereof extending through the sheet 22 and electrically engaging the one end of a related printed circuit type conductor 25 carried on the rear of the front plate (see Fig. 9). Each of the circuit conductors 25 terminates at a related contact area **25*a* at the one edge of the sheet 22. Each contact area 25*a* actually extends from the face of the sheet 22** onto the edge thereof as indicated in Figs. 9 and 2, the edge area facilitating dip soldering operation as will be later evident.

In a similar manner, each of the signal terminals 24, which are invidually designated A, B, C, D, E, and F, as indicated, has a portion thereof extending through the sheet 22 and electrically engaging the one end of a printed circuit type conductor 27 carried on the rear surface (Fig. 9) of the front plate 15. Each of the circuit conductors 27 terminates at a contact area **27*a* along and onto the edge of the sheet 22 opposite to the contact areas 25*a*. The various operating potentials for the circuit package and the input and output signals as required for the circuit modules are passed thereto from the contact areas 25*a* and 27*a*** in a manner that will be later explained.

Referring now to Figs. 1, 2, 3, 4 and particularly Figs. 5 and 6, each of the circuit modules such as the #2 circuit module 18 shown in Figs. 5 and 6, comprises a block like member 28 formed of an insulating material, the block member having a cavity or depression 29 extending therein from one fall thereof to form a rimmed in dish like structure having an end portion 30 of thin cross section. The end portion 30 forms, in effect, an insulating wafer or circuit board which contains printed circuitry on both sides thereof which link various circuit elements such as transistors T1, T2, condensers C1, etc., as required for the particular functional circuit to be formed, the circuit elements being supported on the circuit board 30 and connected in the printed circuit pattern by soldering the leads thereof in "conductive holes" of the circuit pattern, the conductive holes also linking the printed circuit patterns on the two sides of the board, as required. Although the block member 28 and wafer 30 are indicated as being a single member in Fig. 6, it will be appreciated that they could be separately fabricated and then bonded together.

Various points of the circuit pattern or a circuit board at which supply voltages are required, extend to the right hand edge of the circuit board (in Fig. 5) to a related one of seven spaced conductive contact areas 33.

In a similar manner, any points in the circuit arrangement on a circuit board at which an input signal is required, is connected by associated printed circuitry to a desired one of six conductive contact areas 34 (Fig. 5) at the other edge of the circuit board opposite the supply potential contact areas 33. Similarly, any point in the circuit arrangement of a circuit board at which a desired output signal is available, is linked by printed circuitry to a desired one of 6 signal output conductive contact areas 35 (see Fig. 1), the six output signal areas being arranged in two groups of three per group on opposite edges of the circuit board. One or more of the input signal areas 34, instead of being linked by printed circuitry on the circuit board to a signal input point of the functional circuit on the board, may be linked by a printed circuit conductor to one of the signal output areas 35 on the adjacent edge of that board. The purpose for this type of a connection or connections will be explained later.

A circuit module includes an extending border portion 36 which extends above the plane of the circuit board portion 30 (see Fig. 6) and has an outer perimeter of identical shape to the related block structure 28, the border portion being bonded to the block structure 28. The border portion adjacent to the circuit board contact areas 33 includes printed circuitry **33*a* (see Fig. 6) extending each of the supply voltage circuit board contact areas 33 around the outer edge of the adjacent portion of the border and onto the upper face (in Figs. 5 and 6) of the border as indicated. Similarly, the border extension includes printed circuitry 34a extending each of the input signal contact areas 34 around the outer edge of the adjacent portion of the border and onto an upper face of the border 36**, as indicated in Fig. 6.

The net result of the above described construction is a unitary circuit module, it being noted in Fig. 6 that the circuit elements on the one side of the module circuit board portion 30 and the associated printed circuitry on the board are completely enclosed within the confines of the circuit module, while the circuit pattern and associated solder connection on the other side of the circuit board are also completely enclosed within the confines of the module by reason of the extending border 36. The cavity formed in the circuit module between the side of the circuit board carrying the various circuit elements and the adjacent edge of the module, is adapted to receive a suitable weather proofing potting compound 37 (see Figs. 5 and 6). The potting compound is poured into the module cavity encasing the circuit elements as indicated, with the border of the module serving as a mold for the compound. The other surface of the circuit wafer may be similarly potted or not, as required.

Figure 4:
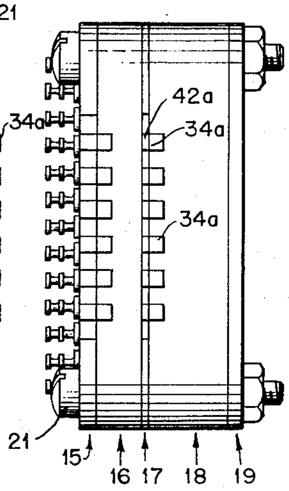
Fig. 4 is a right end view of the representative circuit package.

The border of the block member 28 of each circuit module contains on three sides thereof conductive circuit paths 33b, 34b and 35a which are aligned and electrically continuous with related contact areas 33—33a, 34—34a, and 35 respectively, of the related circuit board. The circuit path 34b, as indicated in Fig. 6 extend partially on the edge of the block member 28. The circuit paths 33b extend around the outer edge of the block and actually on to the lower face of the block member, as indicated. The circuit paths 35a extend each of the output areas 35 of the circuit board, around the outer edge of the adjacent portion of the block member and onto the rearward face (see Figs. 2 and 5) of the block member 28. It will be noted in Fig. 5 that each of the areas 35a on the rearward face are of a substantial width in comparison to the conductive areas 33b. The reason for this will be later evident. Each of the conductive paths 33b in conjunction with its previously mentioned related conductive areas 33 and 33a, provide a continuous conductive path for each of the supply voltage circuit board areas 33, the path extending from the lower face (see Fig. 6) of the circuit module, around the outer face (conductive area 33b and 33a) of the adjacent border of the module (as indicated in Fig. 2) to the upper face (conductive area 33a) of the module. Each of the signal input areas 34 of the circuit board are extended by the associated conductive paths 34a around the border extension 36, as indicated in Figs. 4 and 6, to an upper surface of the circuit module, as indicated in Figs. 3 and 6. Each conductive portion 34b on block member 28 adjacent to and engaging the area 34a (see Fig. 6) is utilized only to facilitate a dip solder bonding therebetween, the border paths 35a in each portion of the block member adjacent the two groups of output signal areas 35 provide a continuous conductive path from each area 35 of the related circuit board along the outer edge of the module, as indicated in Figs. 1 and 5 and onto the rearward face of the module, as indicated in Fig. 1.

Reviewing the circuit paths on the edges and faces of the circuit modules, the supply potential circuit board areas 33 have exposed conductive paths from one face of the related module around the border and onto the other face of the module, the input signal areas 34 have exposed conductive paths from the signal areas 34 circuit around a portion of the module border (actually the extending border 36) onto the forward face of the module as indicated (in Fig. 3), with no connection to the rearward face of the module, while each of the output signal areas 35 has a conductive path from that area around a portion of the module border, onto the rearward face (in Fig. 1) of the module, with no connection to the forward face of the module. The reason for these various exposed paths will be later evident.

Figures 7, 8:
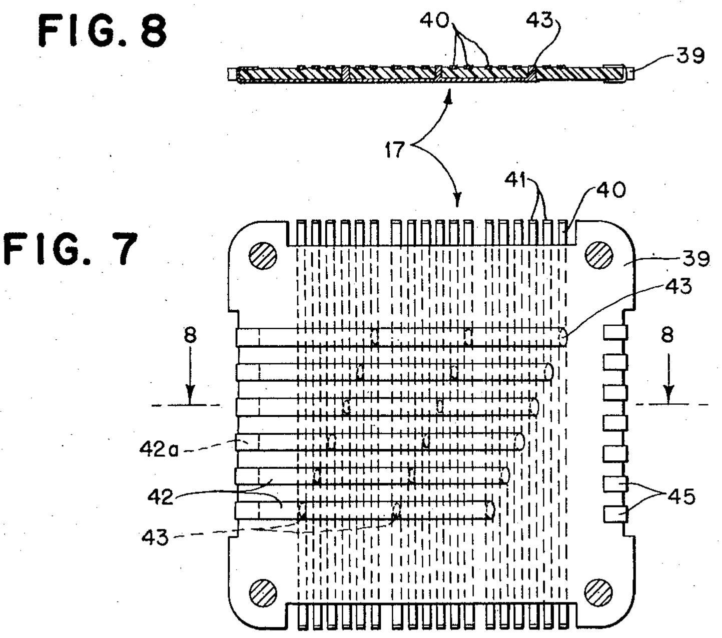
Fig. 7 is a section view taken on the plane of the line 7—7 of Fig. 2 and shows the detail construction of a matrix switch plate used between each adjacent pair of circuit modules on the improved circuit package arrangement, part of the structure of the switch plate being indicated in phantom.
Fig. 8 is a section view taken on the plane of the line 8—8 of Fig. 7 and shows details of the switch plate structure.

Referring now to Figs. 1, 2, 3, 4 and particularly Figs. 7 and 8, the matrix switch plate 17 comprises a sheet 39 of insulating material having the same outline as a circuit module. The sheet 39 has on one side thereof three groups of vertically extending printed circuit conductors 40, there being 6 conductors per group. The sheet 39 has extending tabs 41 aligned with each of the printed conductors 40 and the ends of the conductors 40 extend onto these tabs as indicated. There are thus formed six groups of tabs 41 on the switch plate, 3 groups along one edge of the switch plate 17 and 3 groups along the opposite edge of the switch plate. Arranged on the other side of the sheet and extending at right angles to the conductors 42 are six printed circuit conductors 42. The sheet 39 has various solid conductors extending therethrough so as to link the vertical and horizontal conductors on each side of the sheet in the following manner. The uppermost horizontal conductor 42 in Fig. 7 is electrically linked to the extreme right-hand vertical conductor 40 of each of the 3 groups of such conductors, the next to the uppermost horizontal conductor 42 is electrically linked to the second from the right conductor 40 of each of the three groups of such conductors etc., the lowermost conductor 42 being accordingly connected to the extreme left-hand conductor 40 of each of the three groups. The horizontal conductors 42 extend to the edge of the sheet 39 around the edge thereof, and terminate in a short conductive area 42a on the other side of the sheet, as indicated, it being noted that the areas 42a do not extend sufficiently to engage the extreme left vertical conductors 40 in Fig. 7.

Each of the six groups of extending tabs 41 is of a width equivalent and similarly spaced to the enlarged conductive output areas 35a on the rearward face of a circuit module such as 16 or 18, while the contact areas 42a are of the same spacing as the signal input areas 34a on the forward face of a circuit module. A switch plate 17 is adapted to be arranged between each circuit module such as 16, and the succeeding circuit module, such as 18, with the conductive surface of the tabs 41 engaging the conductive face portions of the output areas 35 of the rear of the foremost module 16 in Fig. 1, while the conductive areas 42a along the rearward surface of the one edge of the plate abut the input areas 34a of the succeeding circuit module 18, as best indicated in Fig. 4.

It will be evident from Fig. 7 that each successive tab 41 of a group terminates in a different one of the conductors 42, the sequence being repeated for each of the groups of tabs. Consequently, by breaking off all tabs but a desired one in each group of 6, prior to the actual arrangement of the switch plate between the modules, it is possible to effect a connection between any module output 35 and the desired input 34 of the succeeding module of the circuit package. The undesired tabs in each group may be broken off prior to the assembly of the circuit package, by an automatic or manually controlled punching mechanism.

On the edge area of the switch plate 17 opposite to the areas 42, are a series of 7 conductive areas 45 extending from one side of the plate around the edge thereof to the other side (see Figs. 7 and 2). It will be evident from Fig. 2 that these areas are adapted to extend the supply voltage areas 33 of each circuit module to the succeeding circuit module, that module in turn extending the supply voltages, to the next switch plate, which extends the voltages to the next circuit module and so forth. It is thus evident from Fig. 2 that the supply potentials are extended from the front plate 15 of the circuit package through which they are introduced, along the entire side of the circuit package, as indicated, to the rear plate 19.

Referring now to Fig. 12 there is shown an alternate manner of constructing the matrix switch plate. The alternate switch plate construction is identical to the previously described plate in every way except that in place of each of the groups of tabs 41 of the previously described switch plate, there is provided a solid extending conductive tab 50. Each tab 50 is adapted to electrically engage a related output area 35 of the preceding circuit module. Each of the groups of conductors 40 in the one side of the plate has associated ends thereof linked to the related tab 50. Prior to the assembly of a switch plate between adjacent modules, holes are punched through the plate adjacent each tab 50 as indicated in Fig. 12, thus eliminating the unwanted conductor path linkages 40 to that tab. It is thus evident that the punching of the holes at each tab in eliminating the unwanted conductor linkages, effects the same selection as the breaking off of the unwanted conductor tab ends 41 on the original switch plate arrangement shown in Fig. 7.

The rear plate 19 of the improved circuit package may be a plain insulating sheet for completing the assembly and is so indicated in the representative circuit package shown. In such an arrangement, the output of the circuit package is obtained by printed circuit conductors on the individual circuit modules linking the output signal points of the related board circuit, to a desired one of the related output areas 35*a*, these areas in turn, being linked by circuit conductors on the circuit board to an input area or areas 34*a* of the same module, as previously explained. The output signals thus appearing on the input areas are passed through any intervening switch plates 17, and any similar arranged intervening circuit module, to a desired one or ones of the signal terminals 24 on the front plate. Thus, in the representative circuit package shown in Figs. 1, 2, 3, 4, etc., which comprises the trigger circuit shown in Fig. 11, the portion of the circuit within the phantom outline being carried on the rearmost circuit module 18, while the other portion of the circuit is carried on the forward circuit module 16, the desired output signals from the trigger are routed from the second module 18 back through the switch plate 17, to the first module 16, to the terminals A and B of the front plate 15, from which they are applied to other desired circuit packages.

If it is desired to utilize all the output areas of a circuit module to apply signals to the inputs of succeeding modules, the output signals from the last circuit module of the circuit package may be rendered available to external circuitry by a modified end plate 46 such as indicated in Figs. 10*a*, 10*b* and 10*c*. In this modified end plate there are provided 6 conductive terminals 47 on the rearward or outer side of the plate which are each linked by suitable metallized conductors 48 to contact areas 48*a*, each of the latter being adapted to be electrically engaged by a related output signal area 35*a* of the last circuit module of the circuit package. Each of the terminals 47 is adapted to have conductors soldered thereto in the usual fashion.

After a circuit package is assembled to the point indicated in Figs. 1, 2, 3 and 4, the various edge exposed and frictionally electrically connected circuit paths of the various components of the package are rendered permanent by a dip soldering operation. Thus in Fig. 2, the line of exposed supply voltage conductive paths indicated and extending from the front plate 15 to the last circuit module 18 are rendered physically and positively electrically continuous, by an individual solder coating extending over each of the voltage paths indicated. The various edge connections between the circuit package components, as indicated in Figs. 1, 4 and 5, are rendered physically and electrically continuous in the same fashion by the dip soldering operation.

The net result of the above described construction is a very compact circuit package, which is simple in construction, and wherein by proper combinations of basic circuit modules of the type indicated, linked by intervening switch matrix plates 17, and provided with suitable end cover structures, and desired functional circuit may be readily constructed. In addition, the construction of the circuit modules wherein all circuit elements are encased in a potting compound within the borders of the module, of each module permits a very weather resistance circuit package to be fabricated from the basic circuit modules.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit package comprising, in combination, a plurality of stacked circuit modules, each module comprising a frame structure of insulating material supporting circuitry and associated circuit elements, input signal points of said circuitry terminating in exposed input signal terminals along a forward face of said module, and output signal points of said circuitry terminating in exposed output signal terminals along a rearward face of said module, a matrix switch plate arranged between each module and its succeeding module in said stack, said plate containing a grid conductor pattern with vertical lines on a rearward side and horizontal lines on a forward side, said horizontal grid lines being arranged in groups each having a number of conductors equal to the number of input terminals of a module, permanent connections being made in said plate between the vertical and horizontal grid lines on opposite sides of said plate in such fashion that each vertical line is electrically common to corresponding ones of each said groups of horizontal lines, said vertical lines terminating in input signal terminals located on one edge of the plate so as to each electrically engage a related input signal terminal of the succeeding module, said horizontal grid lines on each end thereof having removable terminal portions thereof extending beyond said plate, each group of extending terminals being aligned for engagement with a related one of said output terminals on the preceding module all of said extending terminals of a group associated with any particular one output terminal but a desired one or ones being removed prior to the actual arrangement of switch plate, between adjacent modules, to accordingly effect a connection through said plate between any module output and a desired input or inputs of the succeeding module of the circuit package.

2. An electrical circuit assembly comprising, in combination, a plurality of individual circuit boards each having metallized conductors thereon which form a part of said assembly, each board also having a plurality of similarly situated first and second edge conductors thereon, connection means for selectively connecting each of said second edge conductors of a circuit board to any selected one or ones of said first edge conductors of a succeeding adjacent board, said connector means comprising an insulating plate arranged between adjacent circuit boards, said plate containing a grid conductor pattern with first spaced metallized conductors or a rearward side and second spaced metallized conductors on a forward side, said second spaced conductors being arranged in groups, each group having a number of conductors equal to the number of said first edge conductors of a circuit board, permanent connections made in said plate between the said first and second spaced conductors on opposite sides of said plate in such fashion that each said first spaced conductors is electrically linked to a particular related one of said second spaced conductors of each group of said latter conductors, said first spaced conductor terminating in edge terminals which engage related first edge conductors of the adjacent board, each said second spaced conductors having a removable terminal portion, the terminal portions of each said groups of second spaced conductors being aligned for engagement with a related one of said second edge conductors of a circuit board, all of said terminal portions but a desired one or ones of each said groups being removed.

3. A circuit package comprising, in combination, a plurality of stacked circuit modules, each module comprising a rectangular frame structure of insulating material and a circuit board including printed circuitry and associated circuit elements secured therein, supply voltage points of said circuit board circuitry terminating in exposed service voltage terminals along one edge of said module, input signal points terminating in exposed signal terminals along another edge of said module, and output signal points terminating in exposed output signal terminals along other edges of said module, a matrix switch plate arranged between each module and its succeeding module in said stack, said plate having exposed contact areas along one edge which electrically link the service voltage terminals of adjacent modules, said plate containing a grid conductor pattern with vertical lines on a rearward side and horizontal lines on a forward side, said horizontal grid lines being arranged in groups each having a number of conductors equal to the number of input terminals of a module, permanent connections being made in said plate between the vertical and horizontal grid lines on opposite sides of said plate in such fashion that each vertical line is electrically common to corresponding ones of each of said groups of horizontal lines, said vertical lines terminating in input signal terminals located on one edge of the plate so as to each electrically engage a related input signal terminal of the succeeding module, said horizontal grid lines on each end thereof having removable terminal portions thereof extending beyond said plate, each group of extending terminals being aligned for engagement with a related one of said output terminals of the preceding module, all of said extending terminals of a group associated with any particular one output terminal but a desired one or ones being removed prior to the actual arrangement of the switch plate between adjacent modules, to accordingly effect a connection through said plate between any preceding module output and a desired input of the succeeding module of the circuit package.

4. A circuit package in claim 3 further characterized by a front terminal plate arranged adjacent the first module of said stack, said front plate carrying terminals each of which is electrically linked to a related contact area on the edges thereof which engages a corresponding one of said service voltage terminals or input signal terminals of the first module of said stack, and a back terminal plate arranged adjacent the last module of said stack, said back plate carrying terminals each of which is electrically linked to a related contact area which engages a corresponding one of said output signal terminals of the last module of said stack.

5. In a circuit package comprising a plurality of circuit modules, each module having a front and back face and having predetermined points in the circuitry contained in said module connected to related first terminals on the forward face of said module, and other predetermined points in the circuitry connected to related second terminals on a rearward face of said module, means for maintaining said circuit modules in an aligned and stacked relationship, connecting means for effecting a selective connection between each second terminal of a circuit module and a desired first terminal of the successive module of the stack, said connection means comprising a rectangular card of insulating material arranged between each module and its successive module, a series of spaced conductive elements carried on the forward side of said card, each element having an end thereof extending beyond the related edge of said card, said conductive elements being arranged in groups with a number of elements in each group being equal to the number of possible first terminals of a module, the associated extending ends of each group of said conductors being adapted to electrically contact a related one of said second terminals of the preceding module, said conductor element ends being readily adapted to be broken off manually, a second series of spaced conductive elements carried in the rearward face of said card, said second conductive elements being of a number equal to the number of said first terminals of a circuit module and each having a terminal area at an end thereof which electrically engages a related first terminal of the succeeding module, permanent connection means extending through said card and electrically linking corresponding ones of each of said groups of conductive elements to a related one of said second series of elements, all said extending conductor ends of a group adapted for cooperation with the related second terminal being broken off except a selected one or ones linked to the desired first terminal or terminals of the suceeding module.

6. An electrical circuit assembly comprising, in combination, a plurality of individual circuit boards each having metallized conductors thereon which form a part of said assembly, each board also having a first edge conductor, and a plurality of second edge conductors thereon, connection means for selectively connecting said first edge conductor of a circuit board to any selected one or ones of said second edge conductors of a succeeding circuit board, said connection means comprising an insulating member arranged between adjacent circuit boards, said member having a plurality of conductor elements on a first face thereof, one for each of said second edge conductors of a circuit board, each of said conductor elements including a contact member electrically engaging a related one of said second edge conductor of the succeeding circuit board, a plurality of conductor elements on a second face of said insulating member, one for each said first face conductor elements and permanently electrically linked thereto, each of said second face conductors having a removable terminal portion which electrically engages said first edge conductor of the preceding circuit board, all of the removable terminals but a desired one or ones completing an electrical path or paths from said first edge conductor of one circuit board through said connection means to the desired one or ones of said second terminals of the succeeding circuit board, being removed.

7. An electrical circuit assembly comprising, in combination, a plurality of individual circuit boads each having having metallized conductors thereon which form a part of said assembly, each board also having a first edge conductor and a plurality of second edge conductors thereon, connection means for selectively connecting said first edge conductor of a circuit board to any selected one or ones of said second edge conductors of a succeeding circuit board, said connection means comprising an insulating member arranged between adjacent circuit boards, said member carrying a terminal which electrically engages the first edge conductor of the preceding one of said boards, said member having a plurality of conductor elements on a first face thereof, one for each of said second edge conductors of a circuit board, each of said conductor elements including a contact member electrically engaging a related one of said second edge conductors of the succeeding circuit board, a plurality of conductor elements on a second face of said insulating member, one for each said first face conductors and permanently linked thereto, each of said second face conductors having a breakable electrical linkage to said terminal, all of said linkages but a desired one or ones completing a desired path or paths from said terminal to desired one or ones of the contact members being broken.

8. In a circuit package comprising a plurality of circuit modules and means for maintaining said modules in an aligned and stacked relationship, each module having a front and a back face and having predetermined points in the circuitry contained in said module connected to related first terminals on the forward face of said module, and other predetermined points in the circuitry connected to related second terminals on a rearward face of said module, connection means for effecting a selective connection between each second terminal of a circuit module and a desired first terminal or terminals of the successive module, said connection means comprising, a plate of insulating material arranged between each module and its successive module, said plate having a series of integral tabs extending from an edge thereof, said tabs being adapted to be manually broken from the main body of the plate, a series of first elongated conductive elements carried on the forward side of said plate, each of said elements having an end thereof extending onto a related one of said tabs, said conductive elements being arranged in groups, each group having a number of elements equal to the total number of possible first terminals of a module, the associated tab extending ends of said conductive elements of each group being adapted to electrically contact a related one of said second terminals of the preceding module, a second series of spaced conductive elements carried on the rearward face of said plate, said second conductive elements being of a number equal to the number of input terminals of a circuit module and each having a terminal area at an end thereof which electrically engages a related first terminal of the succeeding module, permanent electrical connections comprising electrically conductive material extending through holes in said plate and electrically linking corresponding ones of each of said groups of conductive elements to a related one of said second series of elements, all of said tabs of each group adapted for cooperation with the related second terminal of a preceding module being broken off prior to the arrangement of the card between the modules except the tab or tabs of the conductive elements which will effect a connection through said plate to the desired first terminal or terminals of the succeeding module when said plate is positioned therebetween.

9. In a circuit package comprising a plurality of circuit modules and means for maintaining said modules in an aligned and stacked relationship, each module having a front and a back face and having predetermined points in the circuitry contained in said module connected to related first terminals on the front face of said module, and other predetermined points in the circuitry connected to related second terminals on the back face of said module connection, means for effecting a selective connection between each second terminal of a circuit module and any desired first terminal or terminals of the successive module, said connection means comprising a plate of insulating material arranged between each module and its successive module, a plurality of first electrical terminals carried on the forward face of said plate, said terminals being readily and separably removable from said plate, said first terminals being arranged in groups, one group for each second terminal of a circuit module and electrically engaged with said related second terminal of the preceding circuit module, each group normally having a number of terminals equal to the number of possible first terminals of a circuit module, a plurality of terminals carried on the rearward face of said plate, one for each of said first terminals of a circuit module and electrically engaged with the related first terminal of the succeeding circuit module, and permanent electrical connections carried by said plate and linking a corresponding one of said terminals of each group to a related one of said terminals on the rearward surface of said plate, a connection being accordingly effected from a second terminal of a preceding module to any desired one or ones of the first terminals of the succeeding module in correspondence to the unremoved terminals in the related group on said plate forward face.

10. In a circuit package comprising a plurality of circuit modules and means for maintaining said modules in an aligned and stacked relationship, each module having a front and a back face and having predetermined points in the circuitry contained in said module connected to related input terminals in the front face of said module, and other predetermined points in the circuitry connected to related output terminals on the back face of said module, means for effecting a selective connection between each output terminal of a circuit module and any desired input terminal or terminals of the successive module, said connection means comprising a plate of insulating material arranged between each module and its successive module, a plurality of first electrical terminals carried on the forward face of said plate, said terminals being readily and separably removable from said plate, said first terminals being arranged in groups, one group for each output terminal of a circuit module and electrically engaged with said related output terminal of the preceding circuit module, each group normally having a number of terminals equal to the number of possible input terminals of a circuit module, a plurality of second terminals carried on the rearward face of said plate, one for each of said input terminals of a circuit module and electrically engaged with the related input terminal of the succeeding circuit module, a plurality of first conductor channels carried on the forward face of said plate, one for each of said first electrical terminals and electrically connected with the related first terminal, when present, a plurality of second conductor channels carried on the rearward face of said plate, one for each of said second electrical terminals and electrically connected to the related second terminal, and permanent electrical connection elements carried by said plate and connecting each of said second conductor channels to corresponding ones of said first channels for each said groups of first terminals, a connection being accordingly effected from an output terminal of a preceding module to any desired one or ones of the input terminals of the succeeding module in correspondence to the unremoved terminals in the related group on said plate forward face.

11. A circuit package comprising, in combination, a plurality of circuit modules, each circuit module including a frame structure of insulating material having a front and rear face area and supporting circuitry with associated circuit elements, said circuitry including electrical connections linking supply potential points, signal input points and signal output points of the circuitry to related exposed contact areas carried at predetermined positions on the edges and faces of said module, clamping means maintaining said circuit modules aligned in a stack, a matrix plate arranged between each pair of adjacent circuit modules, said plate having exposed contact areas extending from a forward face of said plate to a rearward face thereof for electrically linking the supply potential contact areas of the adjacent circuit modules, each said switch plates including means selectively linking the input and output signal contact areas of adjacent circuit modules, said means comprising first terminals electrically engaging the input terminals of the one adjacent module, and second removable conductive terminals arranged in groups, each group engaging a related output terminal of the other adjacent module, a corresponding one of said terminals of each group being electrically connected to a related one of said first conductive terminals, all of said terminals of a group being removed except the desired one or ones thereof linking each output terminals of the one adjacent module, through said plate, to the selected one or ones of the input terminals of the other adjacent module.

12. A circuit package as in claim 11 further characterized by the provision of a first terminal plate formed of insulating material and arranged adjacent the front face of the first circuit module of the stack, said terminal plate carrying terminals adapted for connection to external circuitry, each said terminal plate terminals being linked to related contact areas on a rearward face of said terminal plate and which electrically engage related supply potential and input signal contact areas of the first circuit module of the stack, and a second terminal plate similar to said first plate and arranged adjacent the last circuit module of the stack for linking the output signal contact areas of said last circuit module to external circuitry.

13. In a circuit package comprising a plurality of stacked circuit modules, each module having a front and back face and having predetermined points in the circuitry contained in said module connected to related first input terminals on the forward face of said module, and other predetermined points in the circuitry connected to related second terminals on a rearward face of said module, connecting means for effecting a selective connection between each second terminal of a circuit module and a desired first terminal of the successive module of the stack, said connection means comprising an insulating member arranged between each module and its successive module, a series of spaced conductive elements carried on a forward side of said insulating member, said conductive elements being divided into groups with a number of elements in each group being equal to the number of possible first terminals of a module, all said elements of each group being linked to a common contact member adapted to electrically engage a related one of said second terminals of the preceding module, the linkage between each element and its associated common contact member being breakable, a second series of spaced conductive elements carried on the rearward face of said insulating member, said second conductive elements being of a number equal to the number of said first terminals of a circuit module and each having a terminal at an end thereof which electrically engages a related first input terminal of the succeeding module, permanent connection means linking corresponding ones of each said groups of conductive elements to a related one of said second series of elements, all of said linkages between each group of conductive elements and its associated common contact member but a desired one or ones of said linkages being broken.

References Cited in the file of this patent

UNITED STATES PATENTS

| | | |
|---|---|---|
| 2,752,537 | Wolfe | June 26, 1956 |
| 2,778,977 | Lubkin | Jan. 22, 1957 |
| 2,783,416 | Butler | Feb. 26, 1957 |
| 2,786,969 | Blitz | Mar. 26, 1957 |